United States Patent [19]
Nabati et al.

[11] Patent Number: 4,939,586
[45] Date of Patent: Jul. 3, 1990

[54] PROCESS OF STORAGE OF HIGH RESOLUTION IMAGES ON VIDEO DISKS ENCODER AND DECODER FOR THE IMPLEMENTATION OF SAID PROCESS

[75] Inventors: Bahman Nabati, Maisons Alfort; Georges Broussaud, Sceaux, both of France

[73] Assignee: Eduvision (Societe Anonyme), France

[21] Appl. No.: 210,437

[22] Filed: Jun. 23, 1988

[30] Foreign Application Priority Data

Jun. 26, 1987 [FR] France ................... 87 09071

[51] Int. Cl.$^5$ .................. G11B 7/00; H04N 5/76; H04N 5/92
[52] U.S. Cl. ...................... 358/342; 358/335; 358/310; 360/9.1; 360/32
[58] Field of Search .............. 358/310, 335, 342, 108, 358/93, 87; 360/9.1, 35.1, 8, 32

[56] References Cited

U.S. PATENT DOCUMENTS 3,697,678 10/1972 Belleson .................. 360/35.1 X
4,139,869 2/1979 Holt ..................... 360/35.1
4,660,096 4/1987 Arlan et al. ............... 358/342 X

FOREIGN PATENT DOCUMENTS 0118754 2/1984 European Pat. Off. .
2476949 8/1981 France .

Primary Examiner—Robert L. Richardson
Attorney, Agent, or Firm—Sughrue, Mion, Zinn, Macpeak & Seas

[57] ABSTRACT

A method of storing high resolution images on a videodisk in which signals associated with partial images are stored on successive disk tracks, the partial images making up the high resolution images. The partial images have a horizontal overlap of one point per line, which points are subsequently eliminated during the process of reconstructing the high resolution image. An encoder and decoder for effecting the above process is also disclosed.

10 Claims, 3 Drawing Sheets

PROCESS OF STORAGE OF HIGH RESOLUTION IMAGES ON VIDEO DISKS ENCODER AND DECODER FOR THE IMPLEMENTATION OF SAID PROCESS

BACKGROUND OF THE INVENTION

This invention relates to a storage process for high resolution images on a medium of the video disk type, and to the encoders and decoders designed for the implementation of said process.

The present invention is concerned more particularly with a process for recording and restituting high resolution images decomposed in several partial images, each partial image capable of being analyzed according to television standards.

A known method for the storage of fixed high or very high definition images, i.e., is with more than one thousand lines per image, is the use of a standard type video disk intended to store or to restitute images having a 525 or 625 line resolution according to current television standards.

According to a technique described by the inventors, more particularly in the work "videodisks" edited in 1986 by the Publishers MASSON, the high resolution image is divided into several partial low resolution images, each recorded on one turn of a video disk.

To switch over to a 1249 line standard, the said high resolution image is divided in four partial 626 line images.

A device inserted between the output of the video disk reader and a high resolution monitor reconstructs a high resolution image from four partial images.

The strict recomposition of partial images is difficult by reason of the persistence of a joining area in the form of a vertical band a few pixels wide. More particularly in the case of a high resolution image having areas of uniform illumination, characterized by a strictly constant luminance and chrominance on either side of the vertical frontier between two partial images, it is nearly impossible to maintain a constant luminance level throughout the length of the lines.

In fact, by reason of the transient states, significant of the discontinuities which show the beginning and the end of each line of a television image, the corresponding signal features an exponential growth or decay whose time constant is equal to the reciprocal of the video amplifier band-pass.

Moreover, in the case of a series of white lines, the enable time of the significant steady state further increases the width of the luminance disturbance zone.

When the resulting effect affects the right and left screen ends, it is not perceptible by the televiewer but it is unacceptable if it affects the middle of the image, all the more in the case of high resolution images which are supposed to meet high quality requirements.

The purpose of the present invention is to remedy this disadvantage.

SUMMARY OF THE INVENTION

The storage process of high definition images according to this invention consists in dividing the original image with an overlapping of at least one point a line, the overlapping points being eliminated at the reconstruction phase of the high resolution image from the partial low definition images.

The overlapping points have a width corresponding the enabling of the steady state, said overlapping points that substantially correspond to the transient state being eliminated at the phase of the restitution of the final high resolution image. The process of this invention thus provides a satisfactory horizontal continuity of partial images.

According to a particular mode of implementation, the original high resolution image is converted into a digital signal, said digital signal being distributed in a minimum of two blocks having at least one common point each line, every one of said blocks being then re-converted in analog, in view of the recording on the preferably successive turns of a video disc.

The present embodiment has the advantage of a numeric division of the original image, a process which facilitates computer processing and leads to a good process repeatability.

According to another embodiment the acquisition of the original high resolution image is made by an optical system that divides it into at least two partial images having a horizontal overlapping, the signals that correspond respond to said partial images being then recorded on the preferably successive turns of a video disc.

This form of implementation has the particular advantage of accepting the use of low resolution pickups.

The original image is divided into four portions or two series of each two partial images that overlap horizontally. This division permits the restitution of a high resolution, 1249 line image from the storage of standard definition, 625 line images.

The elimination of the horizontal overlapping points at the restitution phase is obtained by shifting the origin of the memory points associated with the digital display of the low resolution images.

This embodiment permits a simplified processing of signals and a satisfactory reconstruction of a high resolution image with a view to its restitution on a high definition monitor or through any kind of transmission.

The number of overlapping points varies from five points to ten points a line. In fact, the enable time of the steady state substantially corresponds to approximately seven points a line, on account of the standard scanning speeds.

The present invention also relates to a decoder for the restitution of fixed high resolution images from the analog signals delivered by a standard type video disk reader. Said decoder comprises means of piloting and controlling the video disk reader, the analog to digital converters, the memories designed to store the digital signals associated with the partial images, the processing means of said digital signals and the digital to analog converters issuing a signal exploitable by a standard peripheral unit, for instance a high resolution monitor.

The decoder of this invention is connected to the current outputs of a standard video disk reader, which does not require any change in its internal architecture.

The present invention is also concerned with an encoder having an analog to digital converter, a memory designed to memorize the digital signals associated with the high definition image, processing means designed to divide the high definition image into partial images with horizontal overlapping, storage memories of digital signals associated with the partial images, digital to analog converters and means for piloting and controling the recorder.

The encoder further comprises a PAL encoder issuing a signal compatible with the characteristics of the recorder.

BRIEF DESCRIPTION OF THE DRAWINGS

The features of the invention will become apparent from the following detailed description with reference to the accompanying drawings which are given for the purpose of illustration alone, and in which.

DETAILED DESCRIPTION OF THE INVENTION

Figure 1:
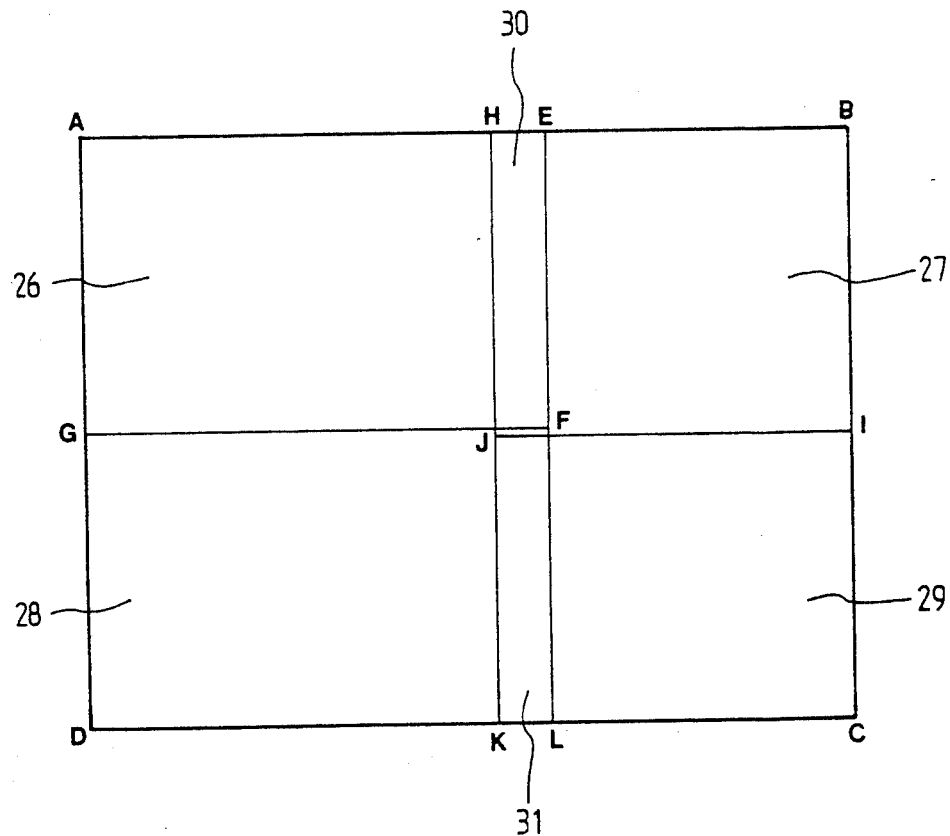
FIG. 1 shows a view of an image divided according to the present invention.

FIG. 1 shows an example of division of the original image into four low resolution images of, say, 625 lines. In this case, the image is restituted with a 1249 line resolution.

The original image A B C D is optically or electronically divided into four partial images: 26, delimited by the points AEFG, 27, delimited by the points HBIJ, 28, delimited by the points GFLD, and 29, delimited by the points JICK. Partial images have a partial horizontal overlapping.

Thus, both partial upper images have an overlapping band 30, delimited by the points HEFG and both lower partial images have an overlapping band 31, delimited by the points JFLK.

The width of said overlapping bands is seven pixels which substantially corresponds to the enabling time for a steady state at the phase of partial image restitution.

Of course this loss of quality also exists on the external sides of the image but it is normally not perceptible by the viewer.

Figure 2:
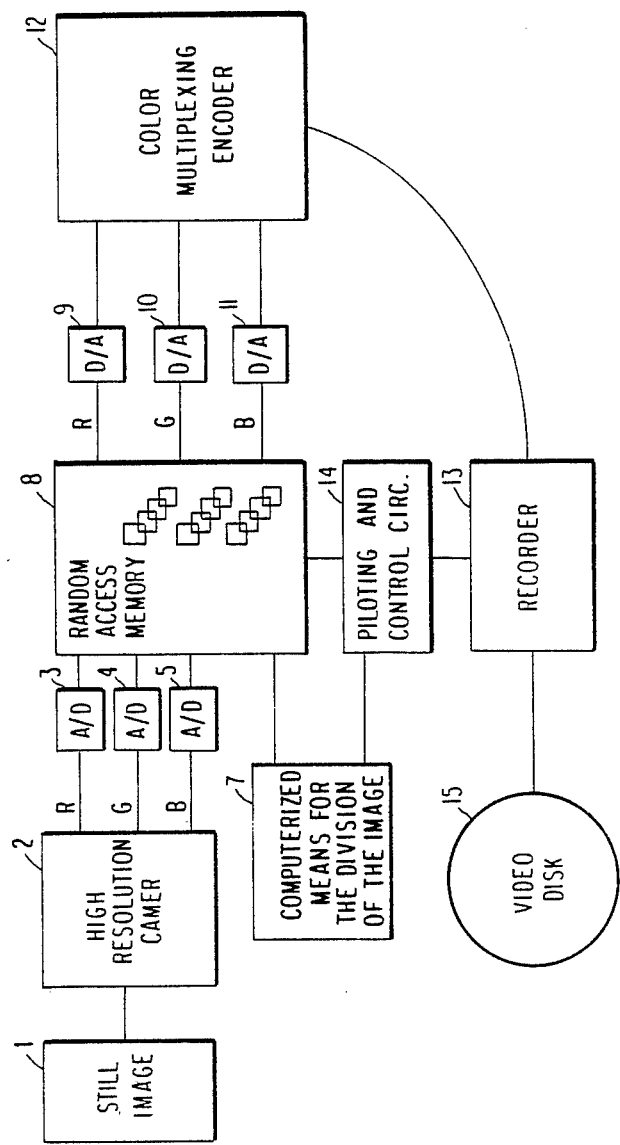
FIG. 2 shows the diagram of an encoder according to this invention.

FIG. 2 shows the diagram of the encoding proces.

The original image 1 is picked up by a high resolution camera of known type, for instance 1249 lines.

It delivers three analog signals V, R, B, associated with the three primary colors that are digitized by means of three analog to digital converters 3, 4, 5.

The three digital high resolution images are each divided into four memory blocks 8 of a storage memory 6 the information contents of which is associated with a partial low definition image.

Computerized process means 7 have for their object the electronic division of the high resolution image and the distribution in the individual memory blocks while ensuring the storage of the overlapping points in the respective memories.

This provides three series of four digital images of usual standards that are transcribed in analog by three digital to analog converters 9, 10, 11, delivering standard low resolution signals. The signals are then preferably coded according to a colour multiplexing code adopted by video disks usually according to the PAL system, by en encoder 12, before their sequential recording on an intermediate medium by a recorder 13.

A piloting and control circuit 14 provides the control of the recorder and the transfer in succession of the four sequences of signals S corresponding to the four partial low definition images. The four partial images are next transferred to a video disk 15 and recorded in four successive turns by known techniques.

Figure 3:
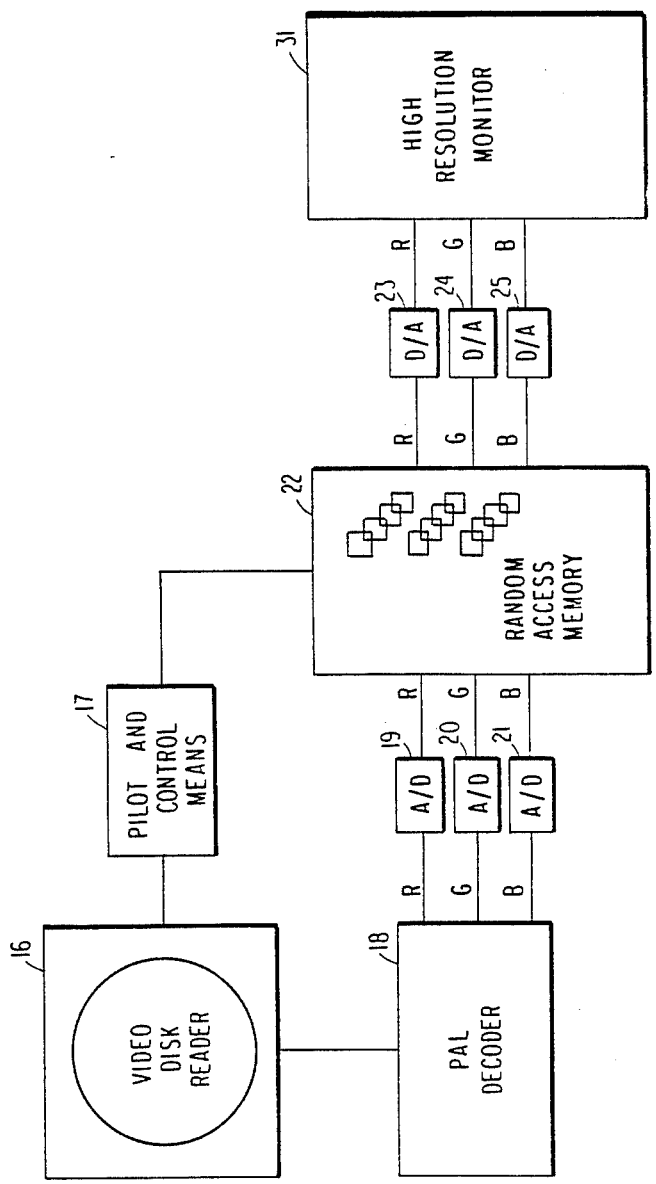
FIG. 3 shows the diagram of a decoder according to this invention.

FIG. 3 shows the principle diagram of the decoder designed to complement a standard type video disk reader 16.

Once the record has been pressed from the intermediary medium carrying the recording of signals coded by means of an encoder according to this invention, it can be read by any standard reader.

A pilot and control means 17 issues the command to retrieve the sequence of four partial low resolution images associated with a determined high resolution image.

The SV signal is decoded by a PAL decoder 18. Then the three signals R, V, B are digitized by means of three analog to digital converters 19, 20, 21.

Partial digital images are stored in three series of four memory blocks 22 with each a capacity of 225 kilobytes. A high resolution digital image is reconstructed by a computerized processing. Said processing basically consists in reconstructing the high resolution image line after line, thereby eliminating the first points in each line that are associated with the overlapping zones of the successive partial images, e.g., by a shift of the origin of the memory location of the memory blocks associated with the partial images comprising overlapping points.

The high resolution image reconstructed in this way is then converted into analog signals by three digital to analog converters 23, 24, 25 that can be exploited by a standard high resolution peripheral unit (31), for instance a high resolution monitor.

This description is given by way of illustration alone and without limitation. The invention covers all alternative implementations, more particularly the acquisition of partial images by an optical dividing of the original high definition image. It also covers all the particular forms of computerized processing of digital images.

What is claimed is:

1. A method of storing and reproducing high resolution images, said method comprising the steps of:
   dividing a high resolution image signal into partial image signals;
   recording said partial image signals on preferably successive turns of a video disk type recording medium, said partial image signals corresponding to partial images having a horizontal overlapping of at least one point per line of said high resolution image;
   reproducing said partial image signals from said recording medium; and
   combining said partial image signals while eliminating said overlapping points to reconstruct said high resolution image signal from the partial image signals recorded on said recording medium.

2. A method according to claim 1, further comprising means for converting said high resolution image signal to a digital signal, said dividing step comprising dividing said digital signal into at least two said partial image signals representing respective blocks with horizontally adjacent blocks having at least one common point per line of said high resolution image, said method further comprising the step of converting said partial image signals to analog signals corresponding to said respective blocks and said recording step comprising recording each of said analog signals on preferably successive turns of said recording medium.

3. A method according to claim 1, wherein said dividing step comprises generating said high resolution image by means of an optical system which breaks up said image into at least two partial images with a horizontal overlapping, said recording step comprising recording signals associated with said partial images on the preferably successive turns of said recording medium.

4. A method according to claim 1, wherein said dividing step comprises dividing said high resolution image signal into at least four partial image signals representing respective partial images some of which are vertically adjacent and some of which are horizontally adjacent, with horizontally adjacent partial images overlapping one another by a least one point per line of said high resolution image.

5. A method according to claim 1, wherein said reproducing step comprises reading said partial image signals from said recording medium digitizing the read signals to obtain digitized reproduced partial image signals, and storing said digital reproduced partial image signals in respective memory locations, and wherein said method further comprises converting said reconstructed high resolution image signal to an analog signal.

6. A method according to claim 5, wherein said combining step comprises shifting the locations in memory associated with each of said partial images.

7. A method according to claim 1, wherein said partial image signals overlap by between 5 and 10 points for every line.

8. A decoder for use in a method of storing and reproducing high resolution images, said method comprising the steps of dividing a high resolution image signal into partial image signals, recording said partial image signals on preferably successive turns of a video disk type recording medium, said partial image signals corresponding to partial images having a horizontal overlapping of at least one point per line of said high resolution image, reproducing said partial image signals from said recording medium by means of a video disk reader, and combining said partial image signals while eliminating said overlapping points to reconstruct said high resolution image signal from the partial image signals recorded on said recording medium signal from the partial image signals recorded on said recording medium said decoder comprising:

means for piloting and controlling the video disk reader (16), a PAL decoder (18) converting said signals delivered by the video disk reader into three analog signals, analog to digital converters (19, 20, 21) for converting said three analog signals into three digital signals, memories (22) for storing portions of said three digital signals associated with the partial images, processing means for processing digital signals stored in said memories to generate a reconstructed digital high resolution image signal, and digital to analog converters (23, 24, 25) for converting said reconstructed digital high resolution image signal to an analog signal exploitable by a standard high resolution peripheral unit.

9. An encoder for use in a method of storing and reproducing high resolution images, said method comprising the steps of dividing a high resolution image signal into partial image signals representing at least two horizontally adjacent partial images which overlap one another by at least one point per line of said high resolution image, recording said partial image signals on preferably successive turns of a video disk type recording medium, reproducing said partial image signals from said recording medium by means of a video disk reader, and combining said partial image signals while eliminating said overlapping points to reconstruct said high resolution image signal from the partial image signals recorded on said recording medium, said encoder comprising:

analog to digital converters (3, 4, 5) for converting an analog high resolution image signal to a digital high resolution image signal, a memory (6) having plural storage memories (8) for storing digital partial image signals after said dividing step, said digital partial image signals having a horizontal overlapping, digital to analog converters (9, 10, 11) for converting respective digital partial image signals to analog partial image signals, and control means (14) to pilot and control a recorder (13) for recording said analog partial image signals.

10. An encoder according to claim 9, said encoder comprising a series of circuits (e.g., 3,8,9, or 4,8,10, or 5,8,11) for processing each color component of said partial image signals and a PAL encoder (12) responsive to outputs of each series of circuits for delivering a signal compatible with said recorder.

* * * * *